(12) United States Patent
Edwards

(10) Patent No.: US 7,295,005 B2
(45) Date of Patent: Nov. 13, 2007

(54) AZIMUTHAL NMR IMAGING WHILE DRILLING

(75) Inventor: Carl M. Edwards, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/322,731

(22) Filed: Dec. 30, 2005

(65) Prior Publication Data

US 2006/0132129 A1    Jun. 22, 2006

Related U.S. Application Data

(63) Continuation-in-part of application No. 10/765,611, filed on Jan. 27, 2004, now Pat. No. 7,012,426, which is a continuation of application No. 09/870,287, filed on May 30, 2001, now Pat. No. 6,720,765.

(60) Provisional application No. 60/646,328, filed on Jan. 24, 2005.

(51) Int. Cl.
*G01V 3/00* (2006.01)

(52) U.S. Cl. ........................ 324/303; 324/319

(58) Field of Classification Search ............... 324/303, 324/319
See application file for complete search history.

(56) References Cited

U.S. PATENT DOCUMENTS

| | | |
|---|---|---|
| 4,350,955 A | 9/1982 | Jackson et al. |
| 4,408,161 A | 10/1983 | Brown |
| 4,714,881 A | 12/1987 | Givens |
| 4,717,877 A | 1/1988 | Taicher et al. |
| 5,055,787 A | 10/1991 | Kleinberg et al. |
| 5,488,342 A | 1/1996 | Hanley |
| 5,610,522 A | 3/1997 | Locatelli et al. |
| 5,646,528 A | 7/1997 | Hanley |
| 5,705,927 A | 1/1998 | Sezginer et al. |
| 5,757,186 A | 5/1998 | Taicher et al. |
| 5,977,768 A | 11/1999 | Sezginer et al. |
| 6,018,243 A | 1/2000 | Taicher et al. |
| 6,023,164 A | 2/2000 | Prammer |
| 6,163,153 A | 12/2000 | Reiderman et al. |

(Continued)

FOREIGN PATENT DOCUMENTS

EP    0581666 A2    7/1993

(Continued)

OTHER PUBLICATIONS

Spadea et al., Optimization Of Printed Coil Arrays For Microscopic Imaging And Spectroscopy, Proceedings- 19th International Conference—IEEE/EMBS, Oct. 30-Nov. 2, 1997, pp. 464-466.

(Continued)

*Primary Examiner*—Louis M. Arana
(74) *Attorney, Agent, or Firm*—Madan, Mossman & Sriram, P.C.

(57) ABSTRACT

NMR measurements are made with a MWD tool having azimuthal sensitivity. The permanent magnet may be a U-shaped magnet or may have an opposed pair of magnets with axial orientation. The tool is designed for pulsing with short sequences for estimating BVI and CBW and minimizes the effect of tool motion.

27 Claims, 3 Drawing Sheets

U.S. PATENT DOCUMENTS

| | | |
|---|---|---|
| 6,173,793 B1 | 1/2001 | Thompson et al. |
| 6,255,817 B1 | 7/2001 | Poitzsch et al. |
| 6,326,784 B1 | 12/2001 | Ganesan et al. |
| 6,373,248 B1 | 4/2002 | Poitzsch et al. |
| 6,459,262 B1 * | 10/2002 | Wisler et al. ............... 324/303 |
| 6,459,263 B2 | 10/2002 | Hawkes et al. |
| 6,564,883 B2 | 5/2003 | Fredericks et al. |
| 6,720,765 B2 | 4/2004 | Edwards et al. |

FOREIGN PATENT DOCUMENTS

| | | |
|---|---|---|
| EP | 0940688 A2 | 3/1999 |
| EP | 0981062 A2 | 7/1999 |
| WO | WO 01/07937 A1 | 2/2001 |
| WO | WO02097475 A1 | 12/2002 |

OTHER PUBLICATIONS

Porter et al., A 16-Element Phased-Array Head Coil, 4th International Conference On Application Of Magnetic Resonance to Food Science, Sep. 7-9, 1998, pp. 272-279.

Hayes et al., Noise Correlations In Data Simultaneously Acquired From Multiple Surface Coil Arrays, Magnetic Resonance In Medicine 16, 1990, pp. 181-191.

Lin et al., Quantitative Spatial/Spectral Analysis Of Magnetic Resonance Imaging Surface And Phased Array Coils Of Arbitrary Geometry Based On Method Of Moment, 18th Annual International Conference Of The IEEE Engineering In Medicine And Biology Society, Amsterdam 1996, pp. 2281-2282.

* cited by examiner

AZIMUTHAL NMR IMAGING WHILE DRILLING

CROSS-REFERENCES TO RELATED APPLICATIONS

This application claims priority from U.S. Provisional Patent Application Ser. No. 60/646,328 filed on Jan. 24, 2005. This application also claims priority as a continuation-in-part of U.S. patent application Ser. No. 10/765,611 filed on 27 Jan. 2004 (now U.S. Pat. No. 7,012,426) which is a continuation of U.S. patent application Ser. No. 09/870,287 filed on May 30, 2001, now U.S. Pat. No. 6,720,765.

BACKGROUND OF THE INVENTION

1. Field of the Invention

The invention is in the field of Nuclear Magnetic Resonance ("NMR") tools. More specifically, the invention pertains to new designs in NMR measuring devices in for obtaining azimuthal NMR images during measurement while drilling.

2. Description of the Related Art

Nuclear Magnetic Resonance has uses in many areas, including the fields of medicine, non-destructive testing, and in well logging in the oil exploration industry. In the well logging industry, NMR is used in determining properties such as porosity of the material, permeability, the bound liquid volume, the clay bound volume (CBW) and bulk volume irreducible (BVI), as well as formation type and oil content.

In many situations, it is desirable to obtain an azimuthal NMR measurement. This measurement may be used to determine formation characteristics such as porosity, bound fluid volume, T2, T1, and permeability. Being able to measure the azimuthal variation of these characteristics is useful for interpreting heterogeneous formations and performing geologically based steering in deviated or horizontal boreholes.

NMR logs in wireline instruments are typically made at much smaller logging speeds than other types of measurements. The stringent requirement placed on the magnitude of the static field gradient in the direction of motion is one reason. As the tool moves through the borehole, the formation volume in which the resonance condition is satisfied at the beginning of a pulse sequence must remain approximately the same through the entire sequence. If the longitudinal gradient is not small, then the sensitive volume will not remain constant. Another design requirement placed on NMR logging tools is the need to keep the RF antenna in place during the pulse sequences. If there is linear motion, previously excited nuclei move out of the sensitive volume and unexcited nuclei move in. Consequently, antennas with small apertures will have undesirable signal attenuation. U.S. Pat. No. 5,610,522 to Locatelli et al. discloses an open magnetic structure that could be used for making azimuthal NMR measurements but fails to include such a teaching and, due to the limited aperture, would have undesirable signal attenuation.

U.S. Pat. No. 5,977,768 to Sezginer et al. teaches the use of a segmented antenna for obtaining azimuthal information. The static magnetic field is produced by a pair of opposed magnets with magnetization parallel to the longitudinal axis of the tool. The region of examination is a toroidal zone around the borehole. By the use of segmented antennas, each antenna receives signals primarily from a quadrant. U.S. Pat. No. 6,255,817 to Poitzsch et al teaches a method for analysis of data from the Sezginer device. U.S. Pat. No. 6,326,784 to Ganesan et al. and EP 0981062A2 to Ganesan et al. disclose arrangements in which gradient coils are used to suppress spin-echo signals for portions of the region of examination. U.S. Pat. No. 6,373,248 to Poitzsch et al. discloses an azimuthally sensitive NMR tool in which the receiving RF antenna has a non-axisymmetric response.

As would be known to those versed in the art, the toroidal region defined by the opposed magnet configuration is relatively thin, as a result of which signal levels are low relative to a transverse-dipole magnet arrangement: restricting the region from which signals are obtained further lowers the signal level It would be desirable to have a method and apparatus for making azimuthally sensitive NMR measurements that has an improved signal to noise ratio over the prior art methods identified above. The present invention satisfies this need.

SUMMARY OF THE INVENTION

One embodiment of the invention is an apparatus for evaluating an earth formation. The apparatus includes a bottomhole assembly (BHA) conveyed in a borehole in the earth formation, the BHA having a longitudinal axis. The apparatus includes at least one sensor assembly carried by the BHA. The at least one sensor assembly includes a U-shaped magnet which provides a static magnetic field in a sensitive region in the formation. The sensor assembly also includes an antenna arrangement which produces a pulsed radio frequency (RF) magnetic field in the sensitive region and receives signals from nuclei in the sensitive region. The antenna arrangement may include a transmitter coil which produces the RF field and a receiver coil which has an axis substantially parallel to the axis of the transmitter coil. The receiver coil may be displaced towards a borehole wall from the transmitter coil. The apparatus may include more than one such sensor assembly. The U-shaped magnet may include a first magnet and a second magnet having opposed directions of magnetization perpendicular to the longitudinal axis, and a magnetically permeable yoke. The gap between ends of the first and second magnets away from the yoke may be adjustable. The RF magnetic field may be produced by activating the antenna arrangement with a CPMG sequence or a modified CPMG sequence having a refocusing angle less than 180°. The apparatus may further include a processor which determines from the received signals a parameter of interest of the earth formation. The parameter of interest may include clay bound water and/or bulk volume irreducible. The sensor assembly may be disposed on a substantially non-rotating sleeve. The BHA may be conveyed into the borehole on a drilling tubular.

Another embodiment of the invention is an apparatus for evaluating an earth formation. The apparatus includes a BHA conveyed in a borehole in the earth formation. A sensor assembly carried by the BHA includes a magnet configuration which produces a static magnetic in a sensitive region in the formation, a transmitter coil having an axis parallel to the longitudinal axis which produces a pulsed RF field in the sensitive region and at least one receiver coil having an axis substantially orthogonal to the axis of the transmitter coil. More than one receiver coil may be positioned about the BHA. The receiver coil may be extendable away from a drill collar. The RF magnetic field is produced by activating the transmitter coil with a CPNG sequence or a modified CMG sequence with a refocusing angle less than 180°. The apparatus may also include a processor which determines from the received signals a parameter of interest of the earth formation. The parameter of interest may be clay bound water and/or bulk volume irreducible.

Another embodiment of the invention is a method of evaluating an earth formation. A BHA is conveyed into a borehole in the earth formation. A static magnetic field having an azimuthal direction is produced in a sensitive region of the earth formation using a U-shaped magnet. A pulsed RF field with a radial direction is is produced in the sensitive region, and signals from nuclei in the sensitive region are received. More than one sensor assembly may be positioned circumferentially around the BHA. Cross-bedding in the formation may be identified from analysis of the signals from the more than one sensor assembly. The RF magnetic field may be produced by using a CPMG sequence or a modified CPMG sequence with a refocusing angle less than 180°. A parameter of interest of the earth formation may be determined from the received signals. The parameter of interest may be clay bound water and/or bulk volume irreducible.

Another embodiment of the invention is a method of evaluating an earth formation. A BHA is conveyed into a borehole in the earth formation. A magnet configuration is used to produce a static magnetic field having a radial direction in a sensitive region in the earth formation. A pulsed RF magnetic filed is produced in the sensitive region. Signals are received from nuclei in the sensitive region using at least one receiver coil having an axis substantially orthogonal to the longitudinal axis of the BHA. Signals may be received from more than one receiver coil. Cross-bedding may be identified using signals from more than one receiver coil. The receiver coil may be mounted on a member extendable from a drill collar. The RF field may be produced by using a CPMG sequence and/or a modified CPMG sequence having a refocusing angle less than 180°. A parameter of interest of the earth formation may be determined from the received signals. The parameter of interest may be clay bound water and/or bulk volume irreducible.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
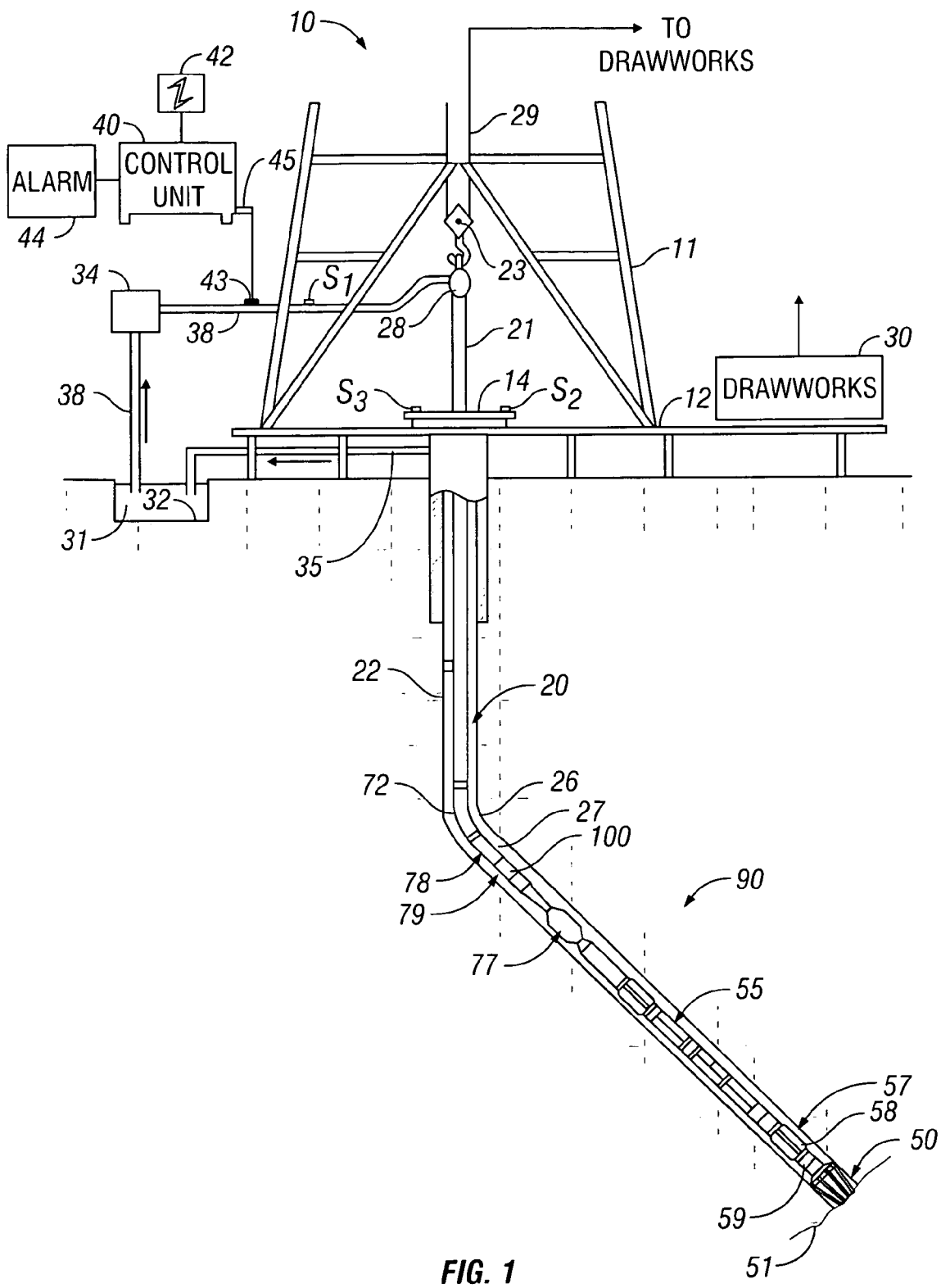
FIG. 1 (prior art) is a schematic illustration of a drilling system suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

Figure 2:
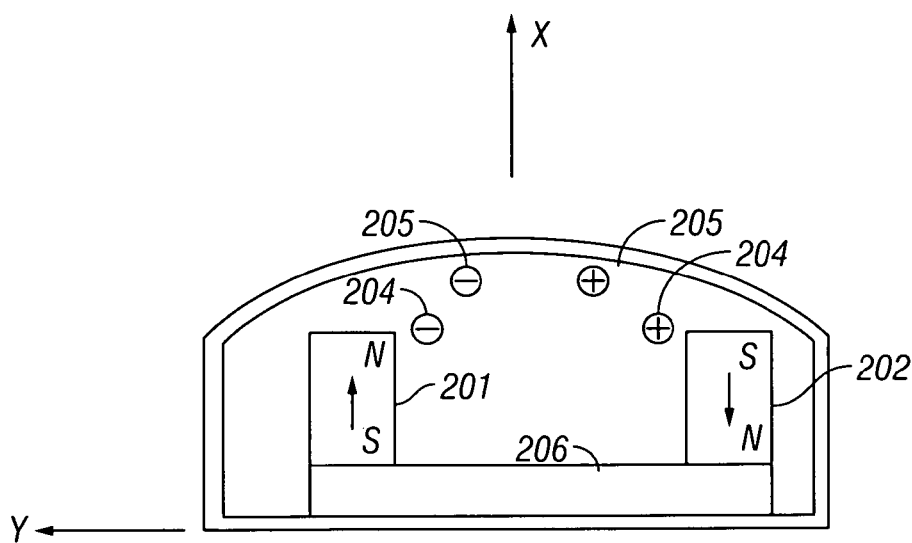
FIG. 2 shows a cross-sectional view of the sensor, showing the magnet system and coil assemblies for a first embodiment of the invention.

As shown in FIG. 2, the sensor assembly comprises of a pair of magnets 201, 202 attached to an iron yoke 206, a transmitter coil assembly 204, a receiver coil assembly 205. The magnet assembly is comprised of two bar magnets whose lengths typically are substantially longer than their width or height. The poles of the magnets are oriented along one of the shorter dimensions, hereafter refened to as the height. As shown in FIG. 2, the north pole of one magnet 201 is attached to a highly permeable iron yoke 206 and the south pole of the other magnet (202) is attached to the same yoke. A gap is left between the poles of the opposing magnets, causing the assembly to resemble a horseshoe magnet. The length of the magnets is oriented parallel to the axis of the logging tool. Consequently, the magnetic field is uniformly perpendicular to the direction of the tool motion. This geometry provides a sufficiently large extent of the static field to polarize the bound water in rock formations. The configuration shown is a modification of the device disclosed in U.S. Pat. No. 6,720,765 to Edwards et al, the contents of which are incorporated herein by reference. The modifications include eliminating the field shifting coil of Edwards.

The magnet configuration described above is horseshoe or U-shaped. The yoke forms the base of the U. The horseshoe magnet design is a novel feature of the invention, having certain advantages over prior art. As one advantage, the gap between the two poles of the magnet assembly can be adjusted. When the length of the gap is decreased, the sensitive region under investigation moves in toward the magnet faces. Moving the sensitive region closer to the device thereby allows the embodiment of the invention to be smaller and thus require less material for construction.

The transmitter coil (204) is located away from the yoke near the outer faces of the horseshoe magnet configuration and is oriented in a plane perpendicular to the x-axis. A RF voltage applied to this coil induces a magnetic field substantially along the x-axis in the sensitive region.

The receiver coil assembly is oriented in the same direction as the transmission coil assembly. It is the intention of the design that the receiver coil assembly is slightly offset from the transmission coil and away from the magnet assemblies. The ability to offset the receiver coil from the transmission coil has the advantage of improving receiver sensitivity and of reducing coupling between the two coils. This offset is better illustrated in FIG. 3.

Figure 3:
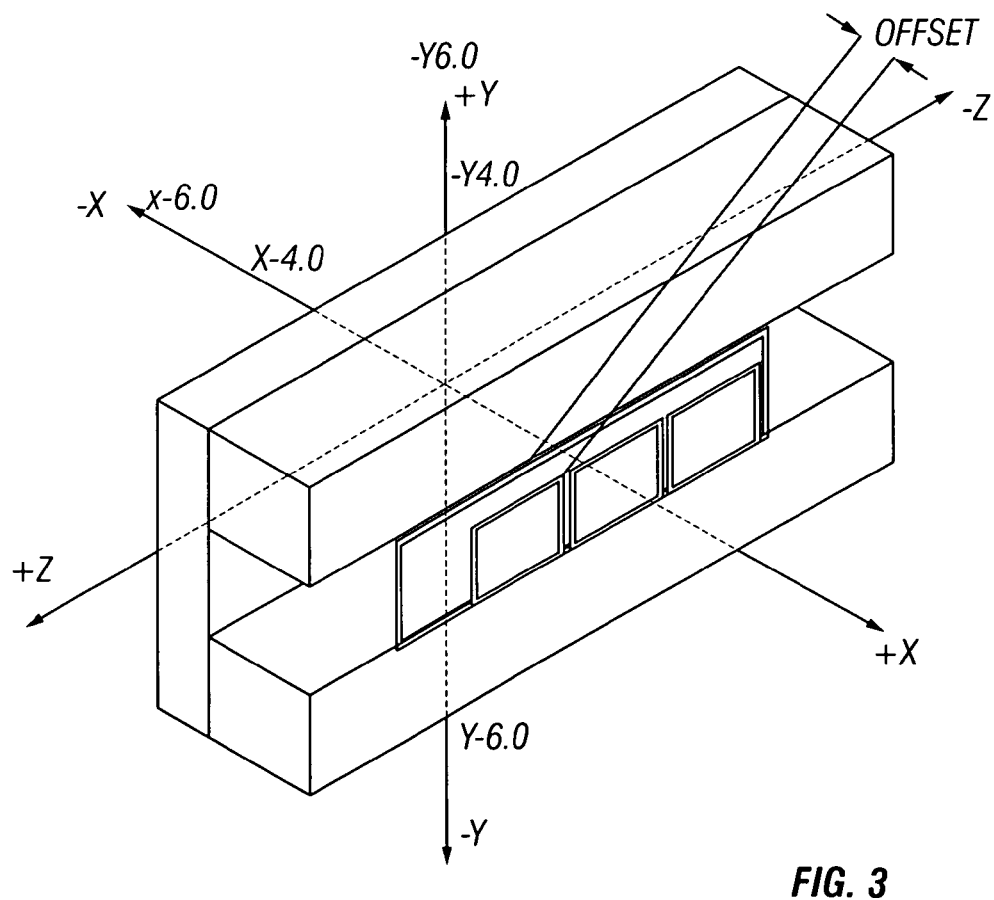
FIG. 3 shows a perspective view of the magnet system and the RF coils for the first embodiment of the invention.

As can be seen in the parallel view of the sensor assembly shown in FIG. 3, the receiver coil assembly is designed to be a set comprised of two or more coils, rather than only one coil. Multiple receiver coils are an innovation over prior art and allows the user a greater flexibility. The gap between the two or more receiver coils can be adjusted, even to the point where coils overlap. Adjusting the gap allows one to obtain optimal coupling between the receiver coils.

One or more of the sensors shown in FIG. 3 may be mounted on a drill collar. Alternatively, one or more of the sensors shown in FIG. 3 may be mounted on a sleeve on the drill collar that may have a different rotational speed than the drill collar and may even be substantially non-rotating. Configurations in which a substantially non-rotating sleeve are disclosed in U.S. Pat. No. 6,173,793 to Thompson et al., and U.S. Pat. No. 6,564,883 to Fredericks et al., having the same assignee as the present invention and the contents of which are incorporated herein by reference. The discussion that follows immediately hereafter is not relevant to the case of a substantially non-rotating sleeve.

A typical rate of penetration into a formation during drilling is about 60 ft/hr (≈18 m/hr.). Rotational speeds typically range from 40-150 rpm, though drillers may balk at values below about 60 rpm. Using these numbers, some design parameters for the NMR tool may be determined.

The linear speed of the sensor is given by $$S = \pi d f \quad (1)$$

where S is the speed, d diameter of the tool, and f is the rotational speed in rpm. The results of the calculation are summarized in Table 1 where the liner speed is given in ft/min:

TABLE 1

Linear speed

| Diameter (in) | Speed (rpm) | | | | | |
|---|---|---|---|---|---|---|
| | 30 | 60 | 75 | 90 | 120 | 150 |
| 6 | 47 | 94 | 118 | 141 | 188 | 236 |
| 8.5 | 67 | 134 | 167 | 200 | 267 | 334 |
| 10 | 79 | 157 | 196 | 236 | 314 | 393 |
| 12.25 | 96 | 192 | 241 | 289 | 385 | 481 |

Based on these linear speeds, it is possible to determine ranges of feasibility of NMR measurements.

For a typical sandstone formation, the time required for an acquisition cycle for determination of clay-bound water (CBW) or bound volume irreducible (BVI) is about 33 ms. In this time, the pad will move 0.79 cm in a 6" borehole at 30 rpm, and 8.1 cm in a 12¼" borehole at 150 rpm. More figures for acquisition cycles are shown in Table 2.

TABLE 2

Linear distance traveled in an acquisition cycle of 33 ms

| Diameter (in) | Speed(rpm) | | | | | |
|---|---|---|---|---|---|---|
| | 30 | 60 | 75 | 90 | 120 | 150 |
| 6 | 0.79 | 1.58 | 1.97 | 2.37 | 3.16 | 3.95 |
| 8½ | 1.12 | 2.24 | 2.80 | 3.36 | 4.43 | 5.60 |
| 10 | 1.32 | 2.63 | 3.29 | 3.95 | 5.27 | 6.58 |
| 12¼ | 1.61 | 3.23 | 4.03 | 4.84 | 6.45 | 8.06 |

In a carbonate formation, the data acquisition time may be three times longer. This increases the distance traveled by the NMR sensor by a factor of 3.

Based on the results of Table 2, it would not be practicable to acquire NMR data at the maximum hole diameter of 12¼" at the highest rotational speeds: the sensor would need to cover an azimuthal angle of at least 90°. It is, however, practical to use the design discussed above in FIGS. 2 and 3 at rotational speeds of up to 75 rpm.

In an alternate embodiment of the invention (not shown), instead of separate transmitter and receiver coils, a single coil may be used for both transmission of the RF pulses and receiving the spin echo signals.

Figure 4:
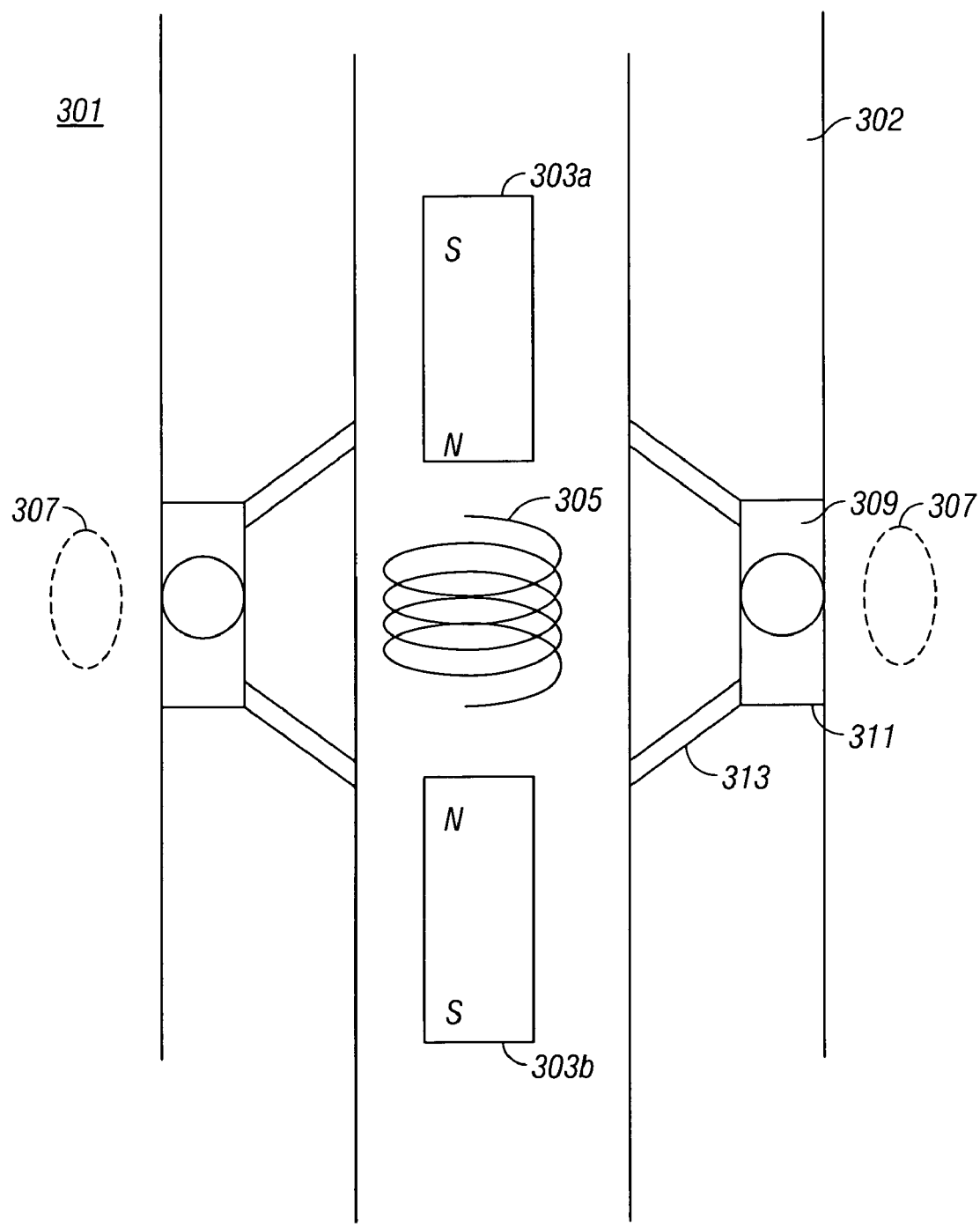
FIG. 4 shows the magnet and antenna arrangement for an alternate embodiment of the invention.

In an alternate embodiment of the invention, a different configuration of magnets and coils is used. Shown in FIG. 4 is the earth formation depicted by 301. The drill collar is depicted by 302. Within the drill collar, an opposed magnet pair 303*a*, 303*b* are positioned to provide a static magnetic field in the earth formation. The combination of the magnets 303*a*, 303*b* and the transmitter antenna 305 gives a toroidal region of sensitivity 307 as in the Jackson configuration. In one embodiment, the receiver antennas 309 have azimuthal orientation. In the example shown in FIG. 4, the receiver antennas are on pads 311 that are extendable by arms 313 from the drill collar. In an alternate embodiment of the invention, the receiver antennas are mounted on extendable ribs from the drill collar as disclosed in Fredericks.

With such an arrangement, the effect of the tool rotation is to average the received signal over the distance traveled by the sensor while acquiring data. As shown in FIG. 4, the transmitter antenna is configured as a solenoid parallel to the longitudinal axis of the tool. The receiver antennas could be configured in a number of different ways. They could be half coaxial antennas. Solenoid configurations may also be used with axes along direction of rotation, or parallel to the tool axis. Planar coils may also be used.

The present invention also deals with the effects of eccentric movement of the tool within the borehole. As the tool moves laterally within the borehole, the region of sensitivity will move with the body of the tool and hence receiver antennas will change their position relative to the region of sensitivity. The sensitivity of the antennas will therefore change as a function of time. In the present invention, estimates of the position of the tool are made synchronously with the NMR measurements. In one embodiment of the invention, acoustic calipers are used to measure the distance to the borehole will in different directions. Mechanical calipers are less desirable due to wear and tear during tool rotation, but could still be used. In an alternate embodiment of the invention, x- and y-component accelerometers are used to make measurements of the lateral components of acceleration of the drill collar near the NMR logging tool. Using the method discussed in U.S. patent application Ser. No. 10/654,410 of Macpherson, having the same assignee as the present invention and the contents of which are incorporated herein by reference, the position of the drill collar within the borehole can be estimated.

The device of the present invention may be used with any one of several pulsing techniques for the determination of BVI and CBW. As noted above, the rapidly relaxing components of the $T_2$ spectrum may be used for determination of these quantities. These rapidly relaxing components may be determined using CPMG sequences with different interecho times as well as the modified CPMG sequence with reduced power requirements taught by Reiderman et al. in U.S. Pat. No. 6,163,153.

An embodiment of the invention with a multiple arm assembly of three of more sensors can further take advantage of its azimuthal imaging capability to determine dip estimates. Dip results that are estimated from CBW and BVI calculation typically may yield different values, which can then indicate cross-bedded formations. As an example, a formation might contain fine and coarse grain sand formations layered with shale laminations. Dip estimates from BVI measurements would indicate the apparent orientation of the sand beds, while CBW measurements would indicate the apparent orientation of shale laminations. True dip can be determined by combining this data with tool and borehole orientations.

The processing of the data may be accomplished by a downhole processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation comprising:
   (a) a bottomhole assembly (BHA) configured to be conveyed in a borehole in the earth formation, the BHA having a longitudinal axis; and
   (b) at least one sensor assembly configured to be carried by the BHA, the at least one sensor assembly including
      (A) a U-shaped magnet which provides a static magnetic field in a sensitive region in said formation,
      (B) a transmitter coil configured to produce a radio frequency field, and
      (C) a receiver coil configured to receive spin echo signals from nuclei in the sensitive region, the receiver coil having an axis substantially parallel to an axis of the transmitter coil.

2. The apparatus of claim 1 wherein the at least one sensor assembly further comprises a plurality of sensor assemblies circumferentially distributed about the BHA.

3. The apparatus of claim 1 wherein the U-shaped magnet further comprises:
   (i) a first magnet and a second magnet having a magnetization direction perpendicular to the longitudinal axis of the BHA, the first and second magnets comprising arms of the U, the first and second magnets having opposite directions of magnetization, and
   (ii) a magnetically permeable yoke forming the base of the U.

4. The apparatus of claim 3 wherein a gap between ends of the first and second magnet away from the yoke is adjustable.

5. The apparatus of claim 1 wherein the antenna arrangement is configured to be activated by with one of (i) a CPMG sequence, and, (ii) a modified CPMG sequence having a refocusing angle less than 180°.

6. The apparatus of claim 1 wherein the at least one receiver coil is displaced towards a wall of the borehole from the transmitter coil.

7. The apparatus of claim 1 further comprising a processor configured to determine from the received signals a parameter of interest of the earth formation.

8. The apparatus of claim 7 wherein the parameter of interest is at least one of (i) clay bound water, and, (ii) bulk volume irreducible.

9. The apparatus of claim 1 wherein the at least one sensor assembly is disposed on a substantially non-rotating sleeve.

10. The apparatus of claim 1 wherein the BHA is configured to be conveyed into the borehole on a drilling tubular.

11. An apparatus for evaluating an earth formation, the apparatus comprising:
   (a) a bottomhole assembly (BHA) configured to be conveyed in a borehole in the earth formation, the BHA having a longitudinal axis; and
   (b) a sensor assembly carried by the BHA, the sensor assembly including
      (A) a magnet configuration configured to provide a static magnetic field in a sensitive region in the formation,
      (B) a transmitter coil having an axis parallel to the longitudinal axis configured to produce a pulsed radio frequency (RF) magnetic field in the sensitive region, and,
      (C) at least one receiver coil extendable away from a drill collar of the BHA configured to receive signals from nuclei in the sensitive region, the at least one receiver coil having an axis substantially orthogonal to an axis of the transmitter coil.

12. The apparatus of claim 11 wherein the at least one receiver coil comprises a plurality of receiver coils disposed about the BHA.

13. The apparatus of claim 11 wherein the transmitter coil is configured to be activated with one of (i) a CPMG sequence, and, (ii) a modified CPMG sequence having a refocusing angle less than 180°.

14. The apparatus of claim 11 further comprising a processor configured to determine from the received signals a parameter of interest of the earth formation.

15. The apparatus of claim 11 wherein the parameter of interest is at least one of (i) clay bound water, and, (ii) bulk volume irreducible.

16. A method of evaluating an earth formation comprising:
   (a) conveying a bottomhole assembly (BHA) conveyed in a borehole in the earth formation, the BHA having a longitudinal axis; and
   (b) using a U-shaped magnet forming part of at least one sensor assembly carried by the BHA and producing a static magnetic field in a sensitive region in said formation, the static magnetic field in the sensitive region having an azimuthal direction,
   (c) producing a pulsed radio frequency (RF) magnetic field in the sensitive region, the RF field having a radial direction in the sensitive region, and,
   (d) receiving signals from nuclei in the sensitive region.

17. The method of claim 16 wherein the at least one sensor assembly further comprises a plurality of sensor assemblies circumferentially distributed about the BHA.

18. The method of claim 16 further comprising identifying a cross-bedding in the earth formation from analysis of the signals from the plurality of sensor assemblies.

19. The method of claim 16 wherein producing said RF field further comprises using one of (i) a CPMG sequence, and, (ii) a modified CPMG sequence having a refocusing angle less than 180°.

20. The method of claim 16 further comprising determining from the signals from the receiver coil a parameter of interest of the earth formation.

21. The method of claim 20 wherein the parameter of interest is at least one of (i) clay bound water, and, (ii) bulk volume irreducible.

22. A method of evaluating an earth formation, the method comprising:
   (a) conveying a bottomhole assembly (BHA) conveyed in a borehole in the earth formation, the BHA having a longitudinal axis;
   (b) using a magnet configuration and producing a static magnetic field in a sensitive region in the formation, the static magnetic field having a radial direction in the sensitive region,
   (c) producing a pulsed radio frequency (RF) magnetic field in the sensitive region; and
   (d) receiving signals from nuclei in the sensitive region using at least one receiver coil having an axis substantially orthogonal to the longitudinal axis, the at least one receiver coil extendable from a body of the BHA.

23. The method of claim 22 wherein the at least one receiver coil comprises a plurality of receiver coils disposed about the BHA, the method further comprising receiving signals using each of the plurality of receiver coils.

24. The method of claim 23 further comprising identifying a cross-bedding in the earth formation from analysis of the signals received by the plurality of receiver coils.

25. The method of claim 22 further producing the RF magnetic field by using one of (i) a CPMG sequence, and, (ii) a modified CPMG sequence having a refocusing angle less than 180°.

26. The method of claim 22 further comprising determining from the signals from the at least one receiver coil a parameter of interest of the earth formation.

27. The method of claim 26 wherein the parameter of interest is at least one of (i) clay bound water, and, (ii) bulk volume irreducible.

* * * * *